United States Patent [19]
Arai et al.

[11] Patent Number: 4,848,225
[45] Date of Patent: Jul. 18, 1989

[54] PRESSURE FIXING ROLLER AND A PRESSURE FIXING DEVICE

[75] Inventors: Takashi Arai, Tokyo; Yutaka Maruyama, Kawasaki; Ikuo Fuchi, Yokohama, all of Japan

[73] Assignee: Canon Kabushiki Kaisha, Tokyo, Japan

[21] Appl. No.: 868,707

[22] Filed: May 30, 1986

[30] Foreign Application Priority Data

Jun. 7, 1985 [JP] Japan .................................. 60-122541

[51] Int. Cl.[4] .......................... B30B 3/04; G03G 15/20
[52] U.S. Cl. ................................ 100/176; 100/93 RP; 100/155 R; 29/123; 29/132; 118/117
[58] Field of Search .................. 29/123, 132; 100/176, 100/93 RP, 160; 355/14 FU, 3 FU; 118/112, 115, 117, 653; 156/155

[56] References Cited

U.S. PATENT DOCUMENTS

| | | | |
|---|---|---|---|
| 344,680 | 6/1886 | Reid | 29/123 X |
| 436,525 | 9/1890 | Hemphill | 29/123 |
| 1,714,268 | 5/1929 | Jones | 29/123 |
| 3,577,619 | 5/1971 | Strandel | 29/132 X |
| 4,207,059 | 6/1980 | Gaitten et al. | 29/132 X |
| 4,372,247 | 2/1983 | Calabnese | 29/132 X |
| 4,399,598 | 8/1983 | Page et al. | 29/123 X |
| 4,782,568 | 11/1988 | Halttula | 29/123 |

FOREIGN PATENT DOCUMENTS

| | | | |
|---|---|---|---|
| 497846 | 3/1929 | Fed. Rep. of Germany | 29/123 |
| 2116863 | 10/1972 | Fed. Rep. of Germany | 100/155 R |
| 25489 | of 1910 | United Kingdom | 29/123 |

Primary Examiner—Andrew M. Falik
Attorney, Agent, or Firm—Fitzpatrick, Cella, Harper & Scinto

[57] ABSTRACT

A pressure fixing roller has a hollow cylindrical member formed of a ceramic material, a shaft member of a metallic material extending through the portion of the hollow cylindrical member and provided with a predetermined clearance between it and the hollow cylindrical member, and end keep members fixedly provided on the shaft member to keep the opposite ends of the hollow cylindrical member urged inward. A pressure fixing device has such a pressure fixing roller.

17 Claims, 3 Drawing Sheets

PRESSURE FIXING ROLLER AND A PRESSURE FIXING DEVICE

BACKGROUND OF THE INVENTION

1. Field of the Invention

This invention relates to presssure fixing device for pressure-fixing toner images on recording paper in an image forming apparatus such as a copying apparatus, a facsimile apparatus or a printer, and to a pressure fixing roller used therein.

2. Related Background Art

A heat fixing devicde using a heating roller has heretofore been used as a fixing device for fixing toner images on recording paper in a copying apparatus, a facsimile apparatus, a printer or the like, but this device has suffered from the disadvantages that it consumes a great deal of heat and accordingly a great deal of electric power, that the necessity of effecting temperature control complicates the device, that generation of a high temperature makes the device dangerous to handle, that a long waiting time is needed before the heat roller reaches a predetermined temperature and that much energy is wasted.

As a device which eliminates these disadvantages, there is known a pressure fixing device in which a pair of rollers are brought into contact with each other with high pressure and recording paper is passed through the portion of contact between the rollers thereby to fix toner images on the recording paper. In the conventional pressure fixing device, however, it is necessary to increase the rigidity of the rollers in order to provide a uniform pressure distribution between the rollers, and this in turn leads to the necessity of employing a material of great rigidity (Young's modulus) such as steel and making the diameter of the rollers large, and as a result, the device has unavoidably become bulky and heavy.

In order to make the rollers light in weight, the inventors have thought of using a ceramic material as the material of the rollers. From the viewpoint that the specific gravity of steel is 7.8–7.9, whereas the specific gravity of a ceramic material is considerably lower, the device can be made much lighter in weight. However, it has been found that the fragility peculiar to the ceramic material makes it difficult for practical use as the material of the pressure fixing roller.

SUMMARY OF THE INVENTION

It is an object of the present invention to provide a pressure fixing roller which is light in weight and usable in practice.

It is another object of the present invention provide a pressure fixing device provided with such pressure fixing roller.

Other objects and features of the present invention will become more fully apparent from the following detailed description taken in conjunction with the accompanying drawings.

DESCRIPTION OF THE PREFERRED EMBODIMENTS

Before embodiments of the present invention are described, description will be made of disadvantages which the inventors have discovered in a roller entirely made of a ceramic material.

Figure 1:
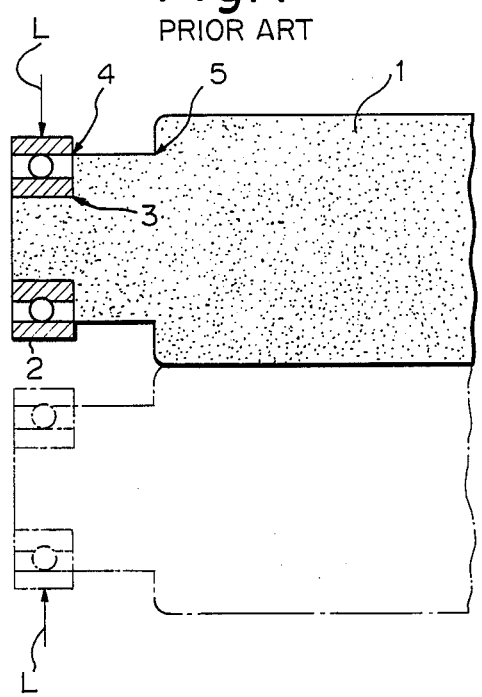
FIG. 1 is a fragmentary longitudinal cross-sectional view of a pressure fixing roller of a conventional structure.
Figure 2:
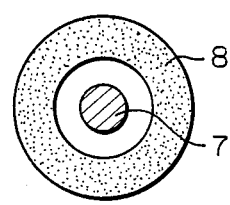
FIG. 2 is a transverse cross-sectional view of a pressure fixing roller according to an embodiment of the present invention.
Figure 3:
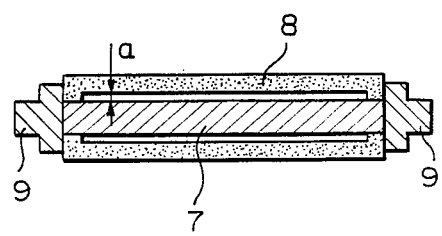
FIG. 3 is a longitudinal cross-sectional view of the roller shown in FIG. 2.

FIG. 1 is a fragmentary cross-sectional view of a roller entirely made of a ceramic material. FIG. 1 shows only one end of the roller. In actual use, bearings 2 are provided at both ends of a pressure fixing roller 1 and the pressure fixing roller 1 is rotatably supported by the bearings 2, and a load in the direction of arrow L is applied to the bearing portion for the purpose of pressure fixation. When the inventors carried out a durability test by preparing a pair of such pressure fixing rollers, applying to the bearing portion a load of a magnitude applied during actual use in the direction of arrow L and supplying paper between the pair of rollers while rotating the rollers, the occurrence of a crack was found in a portion designated by reference numeral 3 in FIG. 1 and damaged portions similar to a peel-off phenomenon were found in portions designated at 4 and 5 in FIG. 1, for a loade=190 kg−250 kg, rate of rotations=40 to 60 rpm, operation time=1000 to 2000 hours and thickness of supplied paper=0.04 to 3.0 mm; these rollers were found to be unusable in practice.

So, as a result of the inventors' study, it has been found that the above-noted problem can be solved by adopting such a roller construction as will hereinafter be described.

This pressure fixing roller has a shaft 7 made of a metallic material such as steel and a cylindrical member 8. The cylindrical member is of a hollow shape and is provided around the shaft 7 with a predetermined clearance therebetween. The material of the cylindrical member is a ceramic material having specific gravity of 3.4 to 3.9, modulus of longitudinal elasticity of $2.7 \times 10^6$ kg/cm$^2$ to $3.7 \times 10^6$ kg/cm$^2$ and surface hardness Hv1200 to 1800 (Vickers' hardness). More specifically, a ceramic material which satisfies the above-mentioned properties, such as alumina, a mixture of alumina and zirconia, silicon nitride, silicon carbide or the like, may be used. Also, the depth a of the clearance (FIG. 4) may suitably be 5–8 mm for the outer diameter of about 30 mm of the roller in the present embodiment, from the viewpoint of securing light weight, strength and rigidity. The roller was made of diameter of about 5 mm at the shaft 7 and a length of about 230 mm for the roller.

According to the present invention embodiment, a shaft formed of a metallic material such as steel and a cylindrical member formed of a ceramic material are used in combination and therefore, the high rigidity of the entire roller will be understood from the fact that Young's modulus of steel is $2.1 \times 10^6$ kg/cm$^2$ and that of the ceramic material is $2.7 \times 10^6$ kg/cm$^2 - 3.7 \times 10^6$ kg/cm². Since the entire roller is not made of a metal, light weight of the roller can be achieved. Also, the roller is not so light in weight as when its entirety is made of a ceramic material, whereas the provision of the clearance contributes to make the roller lighter in weight and therefore, the roller in the present embodiment is lighter in weight than a roller comprising a simple combination of a ceramic material and a metallic material (a solid roller). This lighter weight was about 20–50% for the above-mentioned dimensions (i.e. outer roller diameter of 30 mm and length 230 mm) and materials (as compared with a roller of the same dimensions made of steel). Further, the provision of the clearance has resulted in a substantially equal rigidity characteristic as compared with a roller which is not provided with a clearance, and has succeeded in eliminating the internal stress to the cylindrical member 8 of the ceramic material resulting from the elastic deformation of the shaft 7 and thus, the durability and reliability of the roller has been improved.

Figure 4:
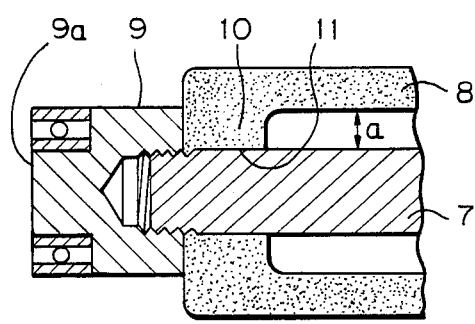
FIG. 4 is an enlarged fragmentary longitudinal cross-sectional view showing the structure of the end portion of the same roller.

As shown in detail in FIG. 4, in the present embodiment, the cylindrical member 8 is fixed to the metallic shaft 7 near the axial end thereof, and the shaft 7 extends outwardly from the fixed portion and constitues a bearing portion. That is, in the present embodiment, the opposite end portions of the cylindrical member 8 (FIG. 4 shows only one end portin, but both end portions are of the same construction) are formed as flange portions 10 extending toward the shaft 7 with respect to the diametrical direction of the roller. Each of the flange portions 10 has an opening 11 centrally thereof, and the shaft 7 extends through the opening 11. In this portion of the opening 11 through which the shaft extends, the shaft 7 is adhesively secured to the cylindrical member 8 or is rigidly joined to the cylindrical member 8 by opening 11 being metalled and therefore shrinkage-fitted. That portion of the shaft 7 which protrudes from the cylindrical member 8 is formed with an external thread which is threadably engaged by a roller end keep member 9 of a metallic material formed with an internal thread. By the cylindrical member 8 being kept urged inward at the opposite ends thereof by the roller end keep members 9, the shaft 7 and the cylindrical member 8 are joined together rigidly. Also, since the cylindrical member 8 is kept urged inward by the roller end keep member 9, compressive stress can be imparted to the cylindrical member 9 and accordingly, the strength of the roller can be increased. Each of the roller end keep members 9 has a bearing portion 9a, around which is provided a bearing similar to that shown in FIGS. 1, and 4 whereby the roller is rotatably supported.

The metallic shaft extending outwardly from the shaft 7 and constituting the bearing portion is formed in this manner. Accordingly, that portion of the shaft where the defect peculiar to the ceramic material appears (previously described in connection with FIG. 1) is formed of a metallic material and therefore, occurrence of said defect can be prevented. When a durability test was carried out under the same conditions as in the case of FIG. 1, no crack or no damaged portion was found even under the conditions such as a load of 250 kg, rate of rotations of 60 rpm, operation time of 2000 hours and paper thickness of 3 mm.

In the above-described embodiment, the roller end keep members have been described as being formed of a metallic material, but if there is no problem in durability when the roller is rotated while being supported by the bearings, the material of the roller end keep members need not always be a metallic material.

Also, in the above-described embodiment, the opposite ends of the shaft 7 are formed with threads on which the roller end keep members 9 are mounted, whereas the shaft 7 and the roller end keep member 9 may be integrally formed only on one end, for example, and the cylindrical member 8 may be urged inwardly by the roller end keep member only from the other end.

Figure 5:
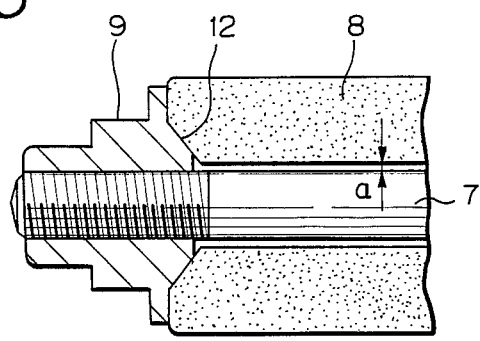
FIGS. 5 to 7 are enlarged fragmentary longitudinal cross-sectional views showing the structure of the end portions of pressure fixing rollers according to further embodiments of the present invention.
Figure 6:
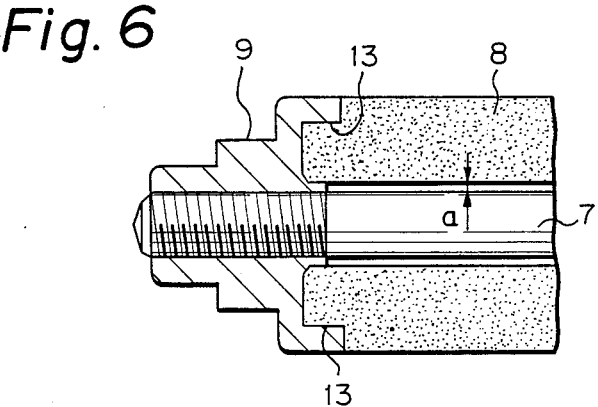
Figure 7:
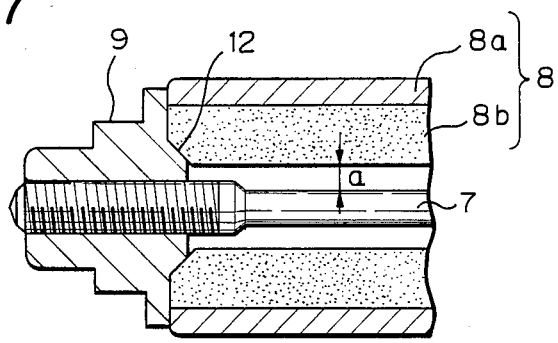

Reference is now made to FIGS. 5, 6 and 7 to describe further embodiments of the present invention. In the embodiments shown in FIGS. 5–7, the cylindrical member 8 is not provided with the flange portion 10, unlike the embodiment shown in FIG. 4. Accordingly, in the present embodiment, the cylindrical member 8 is not fixed to the shaft 7 at the opposite ends thereof. In each embodiment, the shaft 7 extends through the hollow portion of the cylindrical member 8 and the opposite ends of the cylindrical member 8 are kept urged by the roller end keep members 9 coupled to the shaft 7, whereby the cylindrical member 8 is fixed. The coupling between the shaft 7 and the roller end keep members 9 is accomplished by threads as in the embodiment shown in FIG. 4.

Also, as shown in FIGS. 5 and 7, the joined portion of the cylindrical member 8 and the end keep member 9 may be provided with a tapered surface, whereby the coaxiality of the shaft 7, the cylindrical member 8 and the end keep member 9 can be automatically adjusted when the end keep member 9 is secured to the shaft 7 by means of threads.

Also, in the embodiment shown in FIG. 6, the cylindrical member 8 is shrinkage-fitted to the end keep member 9 in a surface indicated at 13. Thereby, the coupling strength of the cylindrical member 8 and the end keep member 9 can be increased. Accordingly, it becomes possible to make the shaft 7 thin.

The embodiment shown in FIG. 7 is one in which the cylindrical member 8 is comprised of a plurality of layers. For example, alumina ceramics (specific gravity of 3.4–3.9) is used as the material of a surface layer 8a, and alumina ceramics (specific gravity of 1.0–3.0) more porous than the material of the surface layer 8a is used as the material of the underlying layer 8b, and thus, the cylindrical member 8 is of a two-layer structure. According to this, even if a damage such as crack occurs in the surface of the cylindrical member 8, the growth of the damage can be prevented by the porosity of the underlying layer 8b. Also, since a material lower in specific gravity than the material of the surface layer 8a is used as the material of the underlying layer 8b, light weight can be achieved as compared with a case where the cylindrical member 8 is formed by only the material of the surface layer 8a.

As other embodiments of the embodiments described above, an adhesive agent (for example, an epoxy adhesive agent) may be placed in the joined surface to enhance the coupling strength of the cylindrical member 8 and the end keep member 9. Also, a surface coating layer may be provided by subjecting the surface of the cylindrical member 8 to a processing such as non-electrical nickel plating or copper molybdenum metallization.

Figure 8:
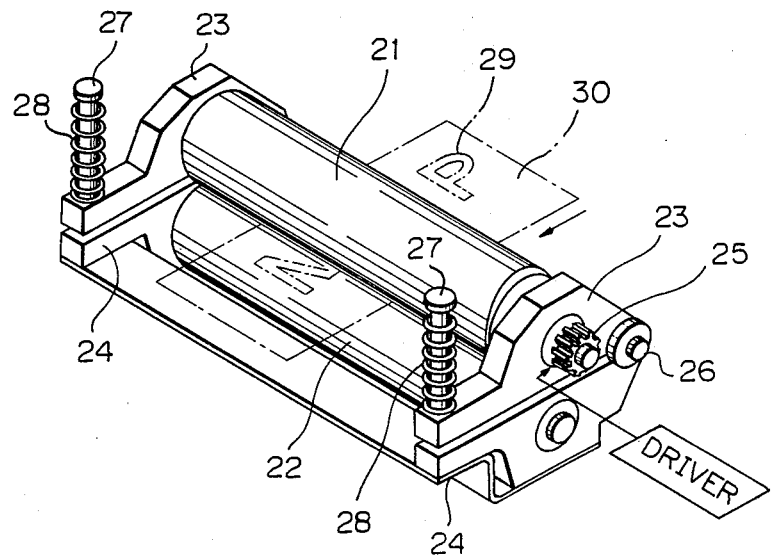
FIG. 8 is a perspective view of a pressure fixing device using the pressure fixing roller of the present invention.

FIG. 8 is a perspective view of a pressure fixing device using the pressure fixing roller according to the present invention. This fixing device has a first fixing roller 21 and a second fixing roller 22, at least one of which has the construction of the pressure fixing roller according to the above-described embodiment of the present invention. Bearings are provided at the opposite ends of the first fixing roller 21, and are fixed to upper side plates 23, and the fixing roller 21 is rotatable relative to the side plate 23. The second fixing roller 22, like the first fixing roller 21, is rotatably mounted on lower side plates 24 through bearings. A gear 25 is fixed to one end of the first fixing roller 21, and a drive mechanism is engaged with the gear 25 to rotate the first fixing roller 21. The second fixing roller 22 rotates following the rotation of the first fixing roller. The upper side plates 23 are pivotally supported relative to the lower side plates 24 near one end therof by shafts 26. Holes are formed in the portions of the upper side plates which are near the ends thereof remote from the shafts 26, and bolts 27 loosely extend through these holes and are threadably engaged with female threads provided in the lower side plates 24 in opposed relationship with the holes. A compression spring 28 is inserted between the head of each bolt 27 and each upper side plate 23, and by the spring forces of the spring 28, the upper side plates 23 are pressed against the lower side plates 24, whereby the first fixing roller 21 and the second fixing roller 22 are brought into pressure contact with each other with a line pressure of about 20-30 kg/cm. In the fixing device of such construction, recording paper 30 bearing a toner image 29 thereon passes through the pressure contact portion so that the toner image 29 is fixed on the recording paper 30 by pressure.

According to the present invention, as described above, light weight of the pressure fixing roller can be achieved while the practical usability thereof may be maintained.

What is claimed is:

1. A pressure fixing roller comprising:
a hollow cylindrical member formed of a ceramic material;
a shaft member of metallic material extending through the hollow portion of said hollow cylindrical member and provided with a predetermined clearance between it and said hollow cylindrical member; and
end keep member fixedly provided on said shaft member to keep opposite ends of said hollow cylindrical member urged inward,
wherin the opposite ends of said hollow cylindrical member have flange portions extending toward said shaft member with respect to the diametrical direction of said cylindrical member, said flange portions being provided with openings through which said shaft member extends, said shaft member being fixed to said flange portions in the portions of said shaft member which extend through said openings, and said end keep members being fixedly attached on the portions of said shaft member which extend through said openings.

2. A pressure fixing roller comprising:
a hollow cylindrical member formed of a ceramic material;
a shaft member of metallic material extending through the hollow portion of said hollow cylindrical member and provided with a predetermined clearance between it and said hollow cylindrical member; and
end keep members fixedly provided on said shaft member to keep opposite ends of said hollow cylindrical member urged inward,
wherein said end keep members are fixed to said shaft member by a threaded coupling located between an inside surface of said end keep member and on an outside surface of said shaft member.

3. A pressure fixing roller comprising:
a hollow cylindrical member formed of a ceramic material;
a shaft member of metallic material extending through the hollow portion of said hollow cylindrical member and provided with a predetermined clearance between it and said hollow cylindrical member; and
end keep members fixedly provided on said shaft member to keep opposite ends of said hollow cylindrical member urged inward,
wherein said hollow cylindrical member has a surface layer formed of a first ceramic material, and a layer underlying said surface layer formed of a second ceramic material more porous than the first ceramic material.

4. A pressure fixing roller comprising:
a hollow cylindrical member formed of a ceramic material;
a shaft member of metallic material extending through the hollow portion of said hollow cylindrical member and provided with a predetermined clearance between it and said hollow cylindrical member; and
end keep members fixedly provided on said shaft member to keep opposite ends of said hollow cylindrical member urged inward,
wherein said ceramic material has a specific gravity of 3.4–3.9, a modulus of longitudinal elasticity of $2.7 \times 10^6$ kg/cm$^2$–$3.7 \times 10^6$ kg/cm$^2$ and a surface hardness of Hv1200–1800 (Vickers' hardness).

5. A pressure fixing roller according to claims 1, 2, 3 or 4, wherein said end keep members are made of metallic material.

6. A pressure fixing device having
a pair of rollers urged against each other and through which passes a recording material bearing an unfixed toner image, said roller pair pressure-fixing the unfixed toner image on the recording material;
support means for rotatably supporting said pair of rollers; and
pressing means for pressing said pair of rollers;
at least one roller of said pair of rollers having a hollow cylindrical member formed of a ceramic material, a shaft member of a metallic material extending through the hollow portion of said hollow cylindrical member and provided with a predetermined clearance between it and said hollow cylindrical member, and end keep members fixedly provided on said shaft member to keep opposite ends of said hollow cylindrical member urged inward, said support means supporting said end keep members.

7. A pressure fixing device according to claim 6, wherein the opposite ends of said hollow cylindrical member have flange portions extending toward said shaft member with respect to the diametrical direction of said cylindrical member, said flange portions being provided with openings through which said shaft member extends, said shaft member being fixed to said flange portions in the portions of said shaft member which extend through said openings, and said end keep members being fixedly attached on the portions of said shaft member which extend through said openings.

8. A pressure fixing device according to claim 6, wherein tapered surfaces are provided as a contact portion between said hollow cylindrical member and said end keep members.

9. A pressure fixing device according to claim 6, wherein said end keep members are fixed to said shaft member by a thread coupling.

10. A pressure fixing device according to claim 6, wherein said hollow cylindrical member has a surface layer formed of a first ceramic material, and a layer underlying said surface layer formed of a second ceramic material more porous than the first ceramic material.

11. A pressure fixing device according to claim 6, wherein said ceramic material is a ceramic material having a specific gravity of 3.4–3.9, a modulus longitudinal elasticity of $2.7 \times 10^6$ kg/cm$^2$–$3.7 \times 10^6$ kg/cm$^2$ and a surface hardness of Hv1200–1800 (Vickers' hardness).

12. A pressure fixing device according to claim 6, wherein said end keep members are made of a metallic material.

13. A pressure fixing roller comprising:
a hollow cylindrical member formed of a ceramic material;
a shaft member of metallic material extending through the hollow portion of said hollow cylindrical member and provided with a predetermined clearance between it and said hollow cylindrival member; and
end keep members having bearing portions supported by bearings and fixedly provided on said shaft member to keep opposite ends of said hollow cylindrical member urged inward,
wherein the opposite ends of said hollow cylindrical member have flange portions extending toward said shaft member with respect to the diametrical direction of said cylindrical member, said flange portions being provided with openings through which said shaft member extends, said shaft member being fixed to said flange portions in the portions of said shaft member which extend through said openings, and said end keep members being fixedly attached on the portions of said shaft member which extend through said openings.

14. A pressure fixing roller comprising:
a hollow cylindrical member formed of a ceramic material;
a shaft member of metallic material extending through the hollow portion of said hollow cylindrical member and provided with a predetermined clearance between it and said hollow cylindrical member; and
end keep members having bearing portions supported by bearings and fixedly provided on said shaft member to keep opposite ends of said hollow cylindrival member urged inward,
wherein tapered surfaces are provided as a contact portion between said hollow cylindrical member and said end keep members.

15. A pressure fixing roller comprising:
a hollow cylindrical member formed of a ceramic material;
a shaft member of metallic material extending through the hollow portion of said hollow cylindrical member and provided with a predetermined clearance between it and said hollow cylindrical member; and
end keep members having bearing portions supported by bearings and fixedly provided on said shaft member to keep opposite ends of said hollow cylindrical member urged inward,
wherein said end keep members are fixed to said shaft member by a threaded coupling located between an inside surface of said end keep member and on an outside surface of said shaft member.

16. A pressure fixing roller comprising:
a hollow clindrical member formed of a ceramic material;
a shaft member of metallic material extending through the hollow portion of said hollow cylindrical member and provided with a predetermined clearance between it and said hollow cylindrical member; and
end keep members having bearing portions supported by bearings and fixedly provided on said shaft member to keep opposite ends of said hollow cylindrical member urged inward,
wherein said hollow cylindrical member has a surface layer formed of a first ceramic material, and a layer underlying said surface layer formed of a second ceramic material more porous than the first ceramic material.

17. A pressure fixing roller comprising:
a hollow cylindrical member formed of a ceramic material;
a shaft member of metallic material extending through the hollow portion of said hollow cylindrical member and provided with a predetermined clearance between it and said hollow cylindrical member; and
end keep members having bearing portions supported by bearings and fixedly provided on said shaft member to keep opposite ends of said hollow cylindrical member urged inward,
wherein said ceramic material has a specific gravity of 3.4–3.9, a modulus of longitudinal elasticity of $2.7 \times 10^6$ kg/cm$^2$–$3.7 \times 10^6$ kg/cm$^2$ and a surface hardness of Hv1200–1800 (Vickers' hardness).

* * * * *

UNITED STATES PATENT AND TRADEMARK OFFICE
CERTIFICATE OF CORRECTION

PATENT NO. : 4,848,225
DATED : July 18, 1989
INVENTOR(S) : TAKASHI ARAI, ET AL.

It is certified that error appears in the above-identified patent and that said Letters Patent is hereby corrected as shown below:

COLUMN 1, line 14, "devicde" should read --device--.

COLUMN 2, line 36, "loade" should read --load--.

COLUMN 3, line 47, "9" should read --8--.

COLUMN 5, line 21, "spring" should read --springs--.

Signed and Sealed this

Eighth Day of May, 1990

Attest:

HARRY F. MANBECK, JR.

*Attesting Officer*      *Commissioner of Patents and Trademarks*